March 22, 1966     K. A. SCHAFER ETAL     3,242,239
FILLING STRUCTURAL CAVITIES
Filed Aug. 16, 1961

INVENTOR.
KENNETH A. SCHAFER
BY Harry B. Keck
ATTORNEY

United States Patent Office 3,242,239
Patented Mar. 22, 1966

3,242,239
FILLING STRUCTURAL CAVITIES
Kenneth A. Schafer, Cedarburg, Wis., assignor to Freeman Chemical Corporation, Port Washington, Wis., a corporation of Delaware
Filed Aug. 16, 1961, Ser. No. 131,841
4 Claims. (Cl. 264—36)

This invention relates to the filling of structural cavities wtih thermosetting resinous compositions. More particularly this invention relates to the use of foamed resin sheets impregnated wtih thermosetting resinous compositions in liquid form which are compressed in structural cavities and maintained therein while the said thermosetting resinous composition is allowed to cure into a hardened thermoset condition.

Structural cavities are widely presented in various arts. Some structural cavities are intentionally created, as, for example, armature slots. Other structural cavities are presented through accident, as, for example, dents in the surfaces of metal articles such as automotive vehicle bodies resulting from collisions. Regardless of whether a structural cavity is intentional or accidental, the present invention may be utilized to fill the structural cavity.

The use of thermosetting resinous compositions as fillers for structural cavities is well known. For example, unsaturated polyester resinous compositions have been widely utilized for this purpose. In general the unsaturated polyester resinous composition is allowed to become partially gelled and hence thixotropic prior to application into a structural cavity. Alternatively the ungelled thermosetting resinous composition may be rendered thixotropic by the inclusion of dehydrated silica gel in the composition. The thixotropic compositions can be formed and shaped to the configuration of the structural cavity, and, upon cure, the thermosetting resinous composition becomes a hardened, thermoset mass of resin which is confined within the structural cavity.

According to the present invention, a sheet of foamed resin having open, connected cells is stuffed into the structural cavity and impregnated with a suitable thermosetting resinous composition which will "wet" the foamed resin. The resin is compressed within the cavity while the thermosetting resinous composition is cured to a hardened thermoset condition in the void spaces of the foamed resin. Neither partial gelation nor thixotropic additives are required in the present invention, although either of these techniques may be used.

It is possible to impregnate the foamed resin with the thermosetting resinous composition in liquid form so that the foamed resin serves, in effect, as a resin-carrier to position the thermosetting resinous composition within the structural cavity.

Foamed resin

The foamed resinous material is preferably foamed polyurethane having open, connected cells. Other materials which have been investigated have been found to be undesirable for want of one or more of the following features:

The foamed resin must possess:
(1) Open-celled configuration;
(2) Flexibility;
(3) Elasticity;
(4) Ready compressibility; and
(5) Wettability with the liquid thermosetting resin.

Polyurethane foam is eminently satisfactory in the above-listed properties where the thermosetting resin is unsaturated polyester resin or epoxy resins.

The preferred foamed resin has cells of substantially uniform diameter in the range of 0.001 to 0.5 inch. The material is provided in sheet form having a thickness from about 0.05 to 2.0 inches in its uncompressed form. Such sheets may be readily compressed to a minor fraction of the uncompressed thickness.

The cells of the foamed resin must be open and connected. Polyurethane foams having open, connected cell structures have been described in U.S. Patent 2,961,710 and Canada Patent 620,248. The cell wall breakdown described in these references is accomplished through the action of organic solvents and inorganic reagents acting upon the customary closed cell polyurethane foams.

Thermosetting resins

Unsaturated polyester resins are well known in the art as a thermosetting resinous material. Such resinous compositions are widely utilized in the fabrication of furniture, automotive vehicle parts such as fenders and body-moldings, boat hulls, machinery cases, machinery covers, helmets and the like. The unsaturated polyester resins usually are solutions of unsaturated polyesters in a polymerizable monomeric solvent such as styrene, vinyl toluene, acrylates, methacrylates and the like. The unsaturated polyester itself usually is formed by the esterification of glycols with dicarboxylic acids or acid anhydrides. At least a part of the dicarboxylic acid or acid anhydride contains ethylenic unsaturation, e.g., maleic acid, maleic anhydride, fumaric acid and the like. Some of the dicarboxylic acid or acid anhydride may be free of ethylenic unsaturation, e.g., phthalic acid, isophthalic acid, terephthalic acid, adipic acid, succinic acid, phthalic anhydride and the like. The unsaturated polyester resin is dissolved in a polymerizable monomer to prepare the customary resinous compositions of the trade. Usually about 20 to 50 parts by weight of styrene and 80 to 50 parts by weight of the unsaturated polyester are mixed to formulate a typical unsaturated polyester resinous composition. On heating, such compositions form three-dimensional (thermoset) polymeric bonds without substantial shrinkage through application of heat in the presence of a suitable polymerization catalyst such as benzoyl peroxide. Customarily the thermosetting resinous compositions contain suitable pigmentation to present an opaque surface when cured. The precise formulation of unsaturated polyester resinous compositions forms no part of the present invention.

The principal object of this invention is to provide a method for filling a structural cavity with thermosetting resinous compositions.

A futrher object of this invention is to provide structural elements having cavities which are filled with thermosetting resinous compositions.

These and other objects and advantages of this invention will become apparent from the following detailed description by reference to the accompanying drawings in which.

Figure 1:
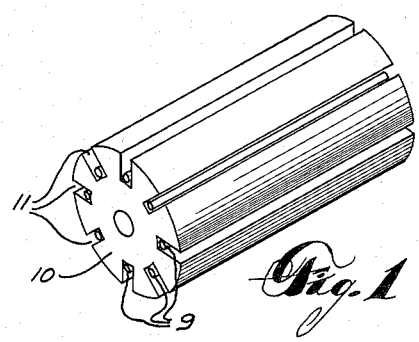
FIGURE 1 is a perspective illustration of a typical armature for use in an electrical motor or generator having customary armature slots.

Referring to FIGURE 1, there is illustrated an armature 10 having a plurality of armature slots 11. Such armatures 10 are used in electrical motors and generators.

Wires or conductor coils 9 are positioned within the slots 11 and are confined therein by various means, one of which is the use of a filling comprising thermosetting resinous composition which is cured to a hardened thermoset condition within the slots 11 to form therein a hardened resinous mass which confines the coils.

Figure 2:
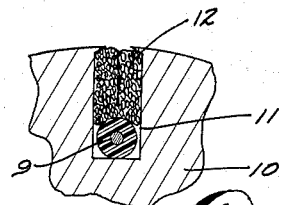
FIGURES 2 and 3 are enlarged illustrations of a single armature slot of the type shown in FIGURE 1 illustrating alternative embodiments of the present cavity filling.
Figure 3:
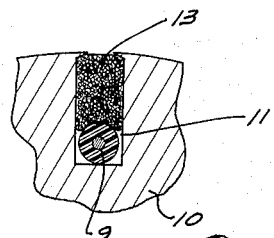

The armature slots 11 are illustrated in FIGURES 2 and 3 wherein a sheet 12 of foamed resin, preferably polyurethane resin, is stuffed into the slot 11 (FIGURE 2) so that it is in a compressed condition within the slot 11. In FIGURE 3, a block 13 of foamed resin, preferably foamed polyurethane resin, is stuffed into the slot 11, whereby the block 13 is maintained under compression.

The foamed resin material 12 or 13 (FIGURE 2 or 3) is impregnated with a thermosetting resinous composition in liquid form. The impregnation may occur prior to the stuffing of the foamed resin 12, 13 into the slot 11 or subsequently. The thermosetting resinous composition must be one which will "wet" the foamed resin. Unsaturated polyester resinous compositions and epoxy resins are suitable for use with foamed polyurethane sheets.

While the foamed resin 12, 13 is confined in the slot 11 under compression, the thermosetting resinous composition is cured by heating the resin which contains a suitable initiator of polymerization. After the thermosetting resinous composition has cured to a hardened thermoset condition, the resinous mass is confined within the slot 11. The resinous mass comprises the thermoset resin entirely filling the void spaces of the foamed resin.

Figure 4:
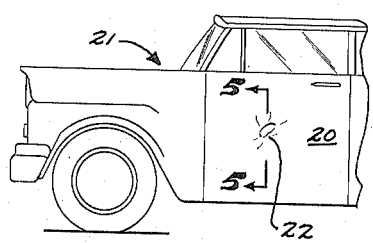
FIGURE 4 is a perspective illustration of the side surfaces of a typical automotive vehicle having a dent therein.
Figure 5:
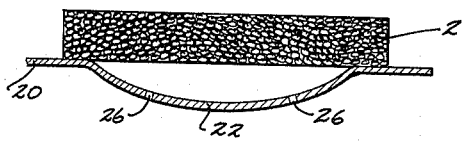
FIGURES 5, 6, and 7 are cross-section illustrations of the dented surface of FIGURE 4 taken along the line 5—5 illustrating the sequential steps of filling the dented surface.
Figure 6:
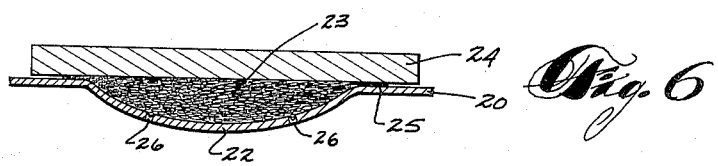
Figure 7:
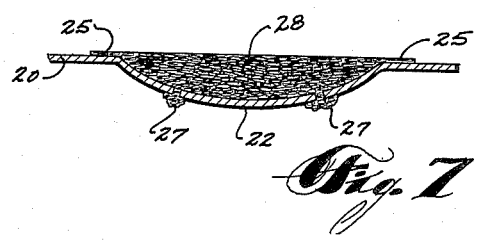

A different type of structural cavity is illustrated in FIGURE 4 wherein the side panel 20 of an automotive vehicle 21 is shown with a dent 22. The dent 22 is seen in cross-section in FIGURES 5, 6 and 7. To fill the dent 22, a sheet 23 of foamed resin is positioned over the outboard surface of the side panel 20. The sheet 23 of foamed resin should have a normal, uncompressed thickness which is at least as thick as the dent 22. The sheet 23 of foamed resin is impregnated with a thermosetting resinous composition in liquid form. A conforming mold element 24 such as a sheet of steel is applied against the foamed resin sheet 23 and causes the sheet 23 of foamed resin to fill in the dent 22. By virtue of the compressibility of the foamed resin sheet 23, the entire dent 20 is filled with some overlap edges 25 at the edges of the dent 22. While the molding element 24 is maintained in compressive engagement with the foamed resin sheet 23, the thermosetting resinous composition is cured to a hardened thermoset condition. Upon removal of the molding element 24, a resinous mass 28 completely fills the dent 22 as seen in FIGURE 6. Any uneven marginal portions such as the edges 25 can be sanded smooth to conform with the panel surface 20. Usually, several holes 26 will be drilled through the panel surface 20 within the dent 22 to receive some of the thermosetting resinous composition which will cure in beads 27 to retain the resinous mass 28 within the dent 22.

According to the provisions of the patent statutes, I have explained the principle, preferred embodiment and mode of operation of my invention and have illustrated and described what I now consider to represent its best embodiment. However, I desire to have it understood that within the scope of the appended claims, the invention may be practiced otherwise than as specifically illustrated and described.

I claim:
1. The method for filling a structural dent comprising positioning a sheet of foamed polyurethane over the said dent, said polyurethane having a normal uncompressed thickness at least as thick as the said dent, said foamed polyurethane sheet having open, connected cells and being impregnated with a thermosetting resinous composition, compressing the said sheet of foamed polyurethane into the said dent by means of a molding element corresponding in configuration to an undented structure, and curing the said thermosetting resinous composition while maintaining the said foamed polyurethane under compression.

2. The method of claim 1 wherein the said foamed polyurethane has cells of substantially uniform diameter in the range of 0.001 to 0.5 inch.

3. The method of claim 1 wherein the said thermosetting resinous composition is an unsaturated polyester resin.

4. The method of claim 1 wherein the said thermosetting resinous composition is an epoxy resin.

References Cited by the Examiner

UNITED STATES PATENTS

| | | | |
|---|---|---|---|
| 2,151,410 | 3/1939 | Richter | 264—321 |
| 2,320,425 | 6/1943 | Glaes et al. | 264—36 |
| 2,666,954 | 1/1954 | Potter | 264—321 |
| 2,863,797 | 12/1958 | Meyer | 154 |

OTHER REFERENCES

"Patch It With Plastics," Modern Plastics, December 1955, pp. 98–100.

ROBERT F. WHITE, *Primary Examiner.*

CARL F. KRAFFT, ALEXANDER H. BRODMERKEL, *Examiners.*